(No Model.)
M. WOGAN.
BALL BEARING.
No. 521,399. Patented June 12, 1894.
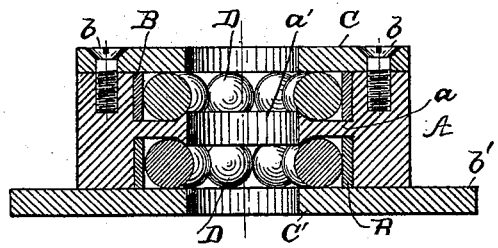
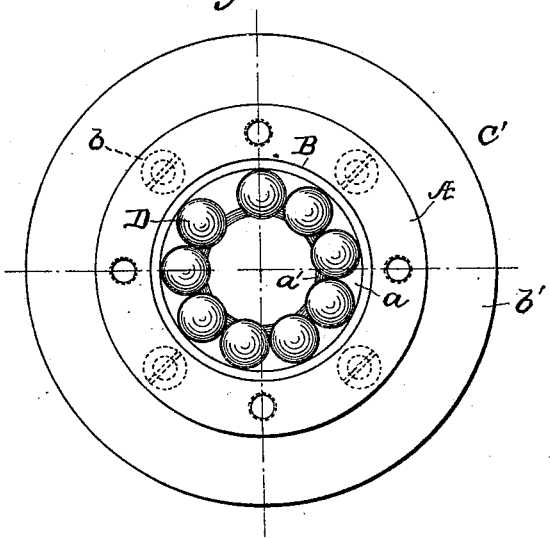
WITNESSES:
INVENTOR.
Michael Wogan,
BY
ATTORNEY.

UNITED STATES PATENT OFFICE.

MICHAEL WOGAN, OF THE UNITED STATES NAVY.

BALL-BEARING.

SPECIFICATION forming part of Letters Patent No. 521,399, dated June 12, 1894.

Application filed March 9, 1894. Serial No. 503,050. (No model.)

*To all whom it may concern:*

Be it known that I, MICHAEL WOGAN, of the United States Navy, have invented certain new and useful Improvements in Ball-Bearings; and I do hereby declare the following to be a full, clear, and exact description of the invention, such as will enable others skilled in the art to which it appertains to make and use the same.

This invention contemplates certain new and useful improvements in roller-bearings and is especially designed to be used in sheaves for pulleys and the like.

The object of the invention is to provide an improved roller-bearing which can be readily applied to a sheave-wheel and which shall possess advantages in point of simplicity, inexpensiveness and general efficiency.

The invention comprises the novel features of construction, and the detail arrangement and combination of parts substantially as hereinafter fully set forth and particularly pointed out in the claim.

In the accompanying drawings:—Figure 1 is a transverse sectional view and Fig. 2 is an elevation with one of the cap-plates removed.

Referring to the drawings, A designates a ring or cylinder having a continuous flange $a$ extending from its inner circumference. The extreme inner edge of this flange is flared in opposite directions, forming inclined shoulders $a'$. The flange $a$ divides the inner portion of the ring into two separate chambers, and in each of the latter is placed a continuous ring B, which rings bear against the inner walls of said chambers. These rings are preferably made of bronze or some suitable material.

C, C', designate two cap-plates which are attached to the ends of ring A by screws $b$. The cap-plate C corresponds in size to the ring A while the cap-plate C' is of greater width having a circular flange $b'$ designed to be fastened to the sheave (not shown). Within the two chambers of the ring are placed two sets of balls or rollers D which are held in place by the end cap-plates and the circular shoulders of the central flange, said rollers being free to move in their respective circular chambers, and having contact with the horizontal rings, which latter can be replaced when worn.

The advantages of my invention are apparent to those skilled in the art to which it appertains and it will be specially observed that I have produced a simple and inexpensive bushing and ball-bearing for sheaves for pulley-blocks. The chambers in which the balls are confined are approximately square and in practice said balls are in contact with the pin or shaft, on which they work, and also the bronze rings at their opposite diametrical points. In this way friction is reduced to a minimum. The shouldered flange serves to keep the balls in place and prevents their accidental displacement or falling out when the pin or shaft is withdrawn.

Another advantage lies in the fact that I am enabled to employ two sets of balls or rollers and thus all rocking or wabbling of the sheave or pulley is prevented.

As before stated this bushing and roller bearing is specially designed for wooden sheaves, but when the latter are made of metal the bushing is not necessary, that is, the sheaves may be fitted with the flared flange and ready to receive the balls and cap-plates.

It will be understood that I do not restrict myself to two series of balls or rollers, since the use of any number of series is clearly within the scope of my invention.

I claim as my invention—

The herein-described improved ball-bearing, comprising the ring or cylinder having an inner central circumferential flange the outer edge of which is flared, forming continuous oppositely extended shoulders, said flange dividing said ring into two chambers, rings or bands in said chambers, two series of balls located in said chambers and held in place by said shoulders, and the cap-plates connected to said ring or cylinder for confining said balls in said chambers, both of said cap-plates having circular openings corresponding to that formed by said flange, one of said cap-plates also having a circumferential flange, the other cap-plate being removably secured to said ring or cylinder, substantially as set forth, both of said series of balls being designed to protrude into the plane of the openings in said cap-plates.

In testimony whereof I have signed this specification in the presence of two subscribing witnesses.

MICHAEL WOGAN.

Witnesses:
MOSES K. HENDERSON,
GEORGE W. CONOVER.